US007910211B2

(12) United States Patent
Avgenaki et al.

(10) Patent No.: US 7,910,211 B2

(45) Date of Patent: Mar. 22, 2011

(54) PROCESS FOR THE PRODUCTION OF MULTI-LAYER COATINGS

(75) Inventors: Giannoula Avgenaki, Duesseldorf (DE); Marcus Brunner, Wuppertal (DE); Volker Kegel, Wuppertal (DE); Volker Paschmann, Essen (DE)

(73) Assignee: E.I. du Pont de Nemours and Company, Wilmington, DE (US)

( * ) Notice: Subject to any disclaimer, the term of this patent is extended or adjusted under 35 U.S.C. 154(b) by 1016 days.

(21) Appl. No.: 11/156,808

(22) Filed: Jun. 20, 2005

(65) Prior Publication Data

US 2006/0286303 A1 Dec. 21, 2006

(51) Int. Cl.

| | |
|---|---|
| ***B32B 9/04*** | (2006.01) |
| ***B05D 1/36*** | (2006.01) |
| ***B05D 3/00*** | (2006.01) |
| ***B05D 7/16*** | (2006.01) |

(52) U.S. Cl. .................. 428/411.1; 427/407.1; 427/409; 427/419.1; 427/419.2; 427/419.5; 427/384; 427/385.5; 427/388.1

(58) Field of Classification Search ............... 427/407.1, 427/409, 419.1, 419.2, 419.5, 384, 385.5, 427/388.1; 428/411.1

See application file for complete search history.

(56) References Cited

U.S. PATENT DOCUMENTS

| | | | | |
|---|---|---|---|---|
| 4,558,090 | A | 12/1985 | Drexler et al. | |
| 4,731,290 | A | 3/1988 | Chang | |
| 4,851,460 | A | 7/1989 | Stranghoner et al. | |
| 4,914,148 | A | 4/1990 | Hille et al. | |
| 4,948,829 | A | 8/1990 | Mitsuji et al. | |
| 5,332,767 | A | 7/1994 | Reisser et al. | |
| 5,342,882 | A | 8/1994 | Gobel et al. | |
| 5,574,166 | A | 11/1996 | Winter et al. | |
| 5,709,909 | A | 1/1998 | Leibfarth et al. | |
| 5,760,123 | A | 6/1998 | Vogt-Birnbrich et al. | |
| 5,968,655 | A | 10/1999 | Hartung et al. | |
| 5,976,343 | A * | 11/1999 | Schlaak | 205/198 |
| 6,221,949 | B1 | 4/2001 | Gross et al. | |
| 6,368,719 | B1 | 4/2002 | Siever et al. | |
| 6,761,762 | B1 | 7/2004 | Greiwe et al. | |
| 2003/0054193 | A1 | 3/2003 | McCollum et al. | |
| 2003/0098238 | A1 | 5/2003 | Kulfan et al. | |

FOREIGN PATENT DOCUMENTS

| | | | |
|---|---|---|---|
| DE | 4438504 | A1 | 5/1996 |
| EP | 0 358 949 | A2 | 3/1990 |
| EP | 0576943 | A1 | 1/1994 |
| EP | 0 990 682 | A1 | 4/2000 |
| WO | WO 94/18278 | A2 | 8/1994 |
| WO | WO 97/47401 | A1 | 12/1997 |
| WO | WO 99/57204 | A1 | 11/1999 |
| WO | WO 2005/021168 | A1 | 3/2005 |
| WO | WO 2006/017197 | A1 | 2/2006 |
| WO | WO 2006/084260 | A1 | 8/2006 |

OTHER PUBLICATIONS

PCT International Search Report and Written Opinion for International Application No. PCT/US2006/022992 dated Nov. 6, 2006.

Kiehl et al. Encapsulated Aluminum Pigments, Progress in Organic Coatings, 37 (1999), pp. 179 to 183.

Copending U.S. Appl. No. 10/950,616, filed Sep. 27, 2004.

* cited by examiner

*Primary Examiner* — William Phillip Fletcher, III

(74) *Attorney, Agent, or Firm* — Sudhir G. Desbmukh

(57) ABSTRACT

The present invention is a process for producing multilayer coatings. The present invention is a process for the production of coatings having a low total coating thickness in the desired color shade without separate baking of the primer surfacer layer.

6 Claims, No Drawings

PROCESS FOR THE PRODUCTION OF MULTI-LAYER COATINGS

BACKGROUND OF THE INVENTION

1. Field of the Invention

The invention relates to a process for the production of multi-layer coatings.

2. Description of the Prior Art

Automotive coatings consist, as a rule, of a separately baked electrodeposition coating (EDC) primer, a separately baked primer surfacer layer (filler layer) applied thereto and a top coat applied thereto comprising a wet-on-wet applied color- and/or special effect-imparting base coat layer and a protective, gloss-imparting clear coat layer. The total primer surfacer plus base coat layer thickness is generally 30 to 60 μm.

Processes are known from WO 97/47401 and U.S. Pat. No. 5,976,343 for the production of decorative multi-layer coatings, which processes allow for the elimination of the application and separate baking of a primer surfacer layer which, of course, reduces coating material consumption and the total layer thickness. These processes have in common the fact that a multi-layer coating structure comprising a first, modified water-borne base coat, a second, unmodified water-borne base coat and a clear coat is applied by a wet-on-wet-on-wet process comprising the joint curing of these three coating layers that are applied to a baked EDC primer. In practice, these processes use two base coat layers that allow for markedly lower total layer thicknesses by approximately 15 to 25 μm, than that of a conventional primer surfacer and base coat. The modified water-borne base coat is produced in these processes from an unmodified water-borne base coat by mixing with an admixture component and is intended to replace the function of a conventional primer surfacer. WO 97/47401 recommends as an admixture component, the addition of polyisocyanate crosslinking agent, while U.S. Pat. No. 5,976,343 describes the addition of polyurethane resin.

A weakness of the processes known from WO 97/47401 and U.S. Pat. No. 5,976,343 is that it is not readily possible to produce multi-layer coatings in certain color shades ("problematic color shades"). The reason is UV light (UV radiation), as a constituent of natural daylight, passes through the coating layers applied to the EDC primer to the surface of the EDC primer to a noticeable extent in the absence of a primer surfacer layer and causes degradation of the EDC primer.

The color shades which are problematic with regard to the production of primer surfacer-free multi-layer coatings are those which, while (like unproblematic color shades) providing a coating which appears to an observer to be opaque, permit an inadmissibly large amount of UV light to penetrate through the multi-layer structure consisting of clear coat, unmodified water-borne base coat and modified water-borne base coat to the surface of the EDC primer and cause long term damage to the EDC layer. Such problematic color shades are to be found both among single (plain) color shades and special effect color shades. Examples may, in particular, be found among water-borne base coats with dark blue single color shades based on phthalocyanine pigments and among water-borne base coats with specific special effect color shades, for example, dark blue metallic color shades or light metallic color shades, such as, in particular, silver color shades and among water-borne base coats with specific special effect color shades containing elevated proportions, for example, 50 wt. % or more, of mica pigments (special effect pigments on the basis of coated, in particular, metal oxide-coated mica) in the pigment content. In the case of the problematic color shades, the UV light may penetrate through the multi-layer coating structure, for example, to an extent exceeding the specified UV transmission level and reaches the EDC layer.

Car manufacturers' specifications state, for example, that UV transmission through the base coat layer in the area of the complete outer skin of the vehicle body should amount to less than 0.1% in the wavelength range of from 280 to 380 nm and less than 0.5% in the wavelength range of from 380 to 400 nm. The possible undesired long-term consequences of an inadmissible level of UV light penetration to the EDC layer are chalking of the EDC layer and delamination of the multi-layer coating over the service life of the coated substrates.

Alternatively, the modified and/or the unmodified water-borne base coat could be applied in an overall higher layer thickness sufficient to prevent to an adequate degree the access of UV light to the EDC primer. However, this would be a backward technological step in the direction of high total film thickness.

The use of UV absorbers in clear coats or base coats is known, for example, from U.S. Pat. No. 5,574,166 and WO 94/18278, and is a solution to the problem of delamination. However, UV absorbers cannot be used to a very great extent in the base coat layers and/or the clear coat layer because of the migration tendency of the UV absorbers and because of the gradual degradation of the UV absorbers, as well as for cost reasons.

Other solutions, which approach the delamination problem from the EDC side are known from EP 0 576 943 A1, U.S. Pat. No. 6,368,719, U.S. 2003/0054193 A1 and U.S. 2003/0098238 A1. These disclose the use of EDC coating compositions which are resistant to the action of UV light due to specially selected binders or due to the addition of suitable additives. This inevitably restricts the EDC composition, such that concessions may have to be made in relation to other technological properties, such as, for example, corrosion protection.

The addition of aqueous filler (extender) pastes containing polyurethane resin to water-borne base coats is known from U.S. Pat. No. 5,968,655. The filler pastes may contain pigments. The water-borne base coats modified by addition of the filler pastes are applied onto EDC-primed substrates, overcoated with unmodified water-borne base coat and clear coat and baked together. The above-mentioned problem solved by the present invention of excessively high UV transmission is neither directly nor indirectly addressed in U.S. Pat. No. 5,968,655.

U.S. Pat. No. 6,221,949 discloses a process for the production of a multi-layer coating wherein a three-layer coating consisting of an up to 35 μm thick coating layer, of a water-borne base coat layer and of a clear coat layer is applied onto an EDC primer and the three coating layers are jointly baked. The coating layer, which is up to 35 μm thick, is applied from an aqueous coating composition, which contains a water-dilutable polyurethane resin as a binder and pigments and/or fillers. With regard to the pigments, it is merely stated that talc has proven itself as a pigment or filler and its content in the total amount of pigments and fillers is from 20 to 80 wt. %. In the examples, talc and titanium dioxide are combined with barium sulfate, iron oxide pigments and/or perylene pigment.

U.S. Pat. No. 6,221,949 does not address, either directly or indirectly, the problems of excessively high UV transmission to the EDC primer. However, the problems of excessively high UV transmission may occur even in the case of the process according to U.S. Pat. No. 6,221,949, especially in the case of problematic color shades. If the proposals regarding composition of the pigment content that may be inferred from the example section of U.S. Pat. No. 6,221,949 are followed, although a multi-layer coating having sufficiently low UV transmission to the EDC primer may be obtained, the desired color shade may not be achieved, at least in the case of problematic color shades, if the base coat layer is applied in a low coating thickness, especially below its black/white opacity (black/white hiding power).

WO 2005/021168 refers, in the paragraph connecting pp. 12 and 13, to a further development of the process known from DE 44 38 504 A1 (the German equivalent of U.S. Pat. No. 6,221,949). In the following paragraph, it is said to be fundamental to the invention that the coating composition used in the process as the first base coat contains as a fundamental component at least one (co)polymer or graft copolymer that is produced in the presence of a polyurethane specified in greater detail.

The term "black/white opacity" is used in the description and the claims. It refers to the dry coating thickness of a coating composition wherein the contrast between the black and white fields of a black and white chart coated with the coating composition is no longer discernible. Following ISO 6504-3 (method B), in order to determine this coating thickness, the coating composition of which the black/white opacity is to be investigated may be applied in a wedge shape onto a black and white chart and dried or hardened.

It has been found that it is possible to produce multi-layer coatings with a low total coating thickness and in the desired color shade without separate baking of a conventional primer surfacer layer, and to be able to sufficiently prevent a long term damaging access of UV light to the EDC primer if a first thin coating layer of an aqueous coating composition that has been pigmented in a particular manner, a second coating layer of a water-borne base coat in a coating thickness below its black/white opacity, and a clear coat layer are applied wet-on-wet-on-wet and jointly baked.

SUMMARY OF THE INVENTION

The invention is directed to a process for the production of multi-layer coatings comprising the successive steps:

1) application of a 8 to 20 μm thick coating layer from an aqueous coating composition A onto a substrate provided with an EDC primer,
2) application of a base coat layer from an aqueous coating composition B in a film thickness, below its black/white opacity, of 5 to 10 μm onto the previously applied coating layer,
3) application of a clear coat layer onto the base coat layer,
4) joint curing of the three coating layers, wherein coating compositions A and B being different from each other, the coating composition A having a ratio by weight of pigment content to resin solids of 0.2 to 0.5:1, the pigment content consisting of 0 to 100 wt. % of at least one aluminum platelet pigment having a platelet thickness from 200 to 500 nm, 0 to 90 wt. % of at least one interference platelet pigment C selected from the group consisting of metal oxide-coated aluminum oxide platelet pigments, metal oxide-coated silicon dioxide platelet pigments and metal oxide-coated mica platelet pigments, 0 to 15 wt. % of at least one carbon black pigment, and 0 to 60 wt. % of at least one pigment other than aluminum platelet pigments, interference platelet pigments C and carbon black pigments, the sum of the wt. % being 100 wt. %, at least 40 wt. % of the pigment content being formed by the at least one aluminum platelet pigment and/or the at least one interference platelet pigment C, and a proportion of at least 20 wt. % of the at least one aluminum platelet pigment having a mean particle diameter from 6 to 15 μm.

DETAILED DESCRIPTION OF THE EMBODIMENTS

The term "pigment content" used in the description and the claims means the sum of all the pigments contained in a coating composition without fillers (extenders). The term "pigments" is used here as in DIN 55944 and covers, in addition to special effect pigments, inorganic white, colored and black pigments and organic colored and black pigments. At the same time, therefore, DIN 55944 distinguishes between pigments and fillers.

In the process according to the invention, conventional substrates provided with an EDC primer are coated. In particular, the substrates are automotive bodies or body parts provided with an EDC primer, in particular, a cathodic electrodeposition (CED) coating. The production of substrates provided with an EDC primer is known to the person skilled in the art. There are no restrictions with regard to the selection of the EDC primer; in particular, EDC primers are also suitable which would be damaged by long-term exposure to UV light.

The substrates having an EDC primer are provided, first of all, with a coating layer of an aqueous coating composition A in a process film thickness in the range from 8 to 20 μm and then with a base coat layer of an aqueous coating composition B in a process film thickness, below its black/white opacity, from 5 to 10 μm. The sum of the coating thickness for the two-layer coatings produced from the coating compositions A and B is, for example, 15 to 30 μm. The film thickness of each individual coating layer and as a result the total film thickness is dependent inter alia on color shade; car manufacturers' requirements for the respective film thicknesses are expressed in the so-called process film thickness (average film thickness which is desired over the entire body in the automotive original coating process), which is directed towards the film thickness for each color shade required to achieve the desired color shade on the substrate and to achieve technological properties (e.g., stone chip resistance) and towards an economic application of the relevant coating composition, i.e., in as thin a film as possible. The ranges of 8 to 20 μm film thickness for the coating layer of coating composition A and of 5 to 10 μm film thickness for the coating layer of coating composition B meet the requirements for coating the relevant substrates, for example, automotive bodies. In particular, this means that a specific value within the stated ranges represents the process film thickness for the respective coating layer.

The film thicknesses (layer thicknesses, coating thicknesses) indicated in the present description and in the claims for coating layers refer in each case to dry film thicknesses.

The coating compositions A are aqueous coating compositions having solids contents of, for example, 18 to 35 wt. %, preferably from 20 to 30 wt. %. The solids content is formed from the resin solids, the pigment content, optionally contained fillers and optionally contained non-volatile additives. The resin solids are composed of the binder solids and of the solids contribution of the crosslinking agent(s) optionally contained in the coating composition A. In addition to one or more binders, the binder solids also, optionally, comprise reactive diluents contained in the coating composition A.

The aqueous coating compositions A are referred to in the description and the claims as coating compositions A for short. The coating compositions A are specially produced coating compositions, and especially not coating compositions produced from coating compositions B by mixing with admixture components, for example, pigmented or unpigmented binders, pigmented or unpigmented polyisocyanate preparations or pigment pastes.

In addition to water, the resin solids, the pigment content, optionally fillers and optionally organic solvents, the coating compositions A may also contain conventional coating additives.

The resin solids of the coating compositions A may comprise one or more binders. Examples include polyester, polyurethane and (meth)acrylic copolymer resins and also hybrid binders derived from these binder classes. Preferably, the resin solids of the coating compositions A comprise polyurethane resin and/or are crosslinkable by formation of urethane groups. Resin solids that are crosslinkable by formation of urethane groups, generally comprise at least one hydroxyl functional binder and at least one polyisocyanate crosslinking agent; one or more hydroxyl functional binders corresponding to a hydroxyl number of, for example, 10 to 180 mg KOH/g of binder solids are, for example, contained, and the solids ratio by weight of binder solids and polyisocyanate crosslinking agent is, for example, 1 to 10:1.

The binders and/or cross-linking agents contained in the resin solids are ionically and/or non-ionically, preferably anionically and/or non-ionically stabilized. Anionic stabilization is preferably achieved by at least partially neutralized carboxyl groups, while non-ionic stabilization is preferably achieved by lateral or terminal polyethylene oxide units.

The term "polyurethane resin" used in the description and the claims does not rule out that the polyurethane resin in question may also contain groups other than urethane groups in the polymer backbone, such as, in particular, ester groups and/or urea groups. Instead, the term "polyurethane resin" of course, also in particular, includes polyurethane resins which contain polyester polyol building blocks and/or urea groups, wherein the latter may, for example, be formed by the reaction of isocyanate groups with water and/or polyamine.

The term "polyisocyanate crosslinking agent(s)" is not restricted to the meaning "free polyisocyanate or free polyisocyanates", but instead also includes blocked polyisocyanate or blocked polyisocyanates. The polyisocyanate(s) accordingly comprise one or more free polyisocyanates, one or more blocked polyisocyanates or a combination of one or more free polyisocyanates and one or more blocked polyisocyanates. Free polyisocyanates are preferred.

The polyisocyanates comprise di- and/or polyisocyanates with aliphatically, cycloaliphatically, araliphatically and/or less preferably aromatically attached isocyanate groups.

The polyisocyanates are liquid at room temperature or are present as an organic solution; the polyisocyanates here exhibit at 23° C. a viscosity of in general 0.5 to 2000 mPa·s. The isocyanate content of the polyisocyanates present in the form of free or latent (blocked, thermally re-dissociable) isocyanate groups is in general in a range from 2 to 25 wt. %, preferably, from 5 to 25 wt. % (calculated as NCO).

Examples of diisocyanates are hexamethylene diisocyanate, tetramethylxylylene diisocyanate, isophorone diisocyanate, dicyclohexylmethane diisocyanate, and cyclohexane diisocyanate.

Examples of polyisocyanates are those which contain heteroatoms in the residue linking the isocyanate groups. Examples of these are polyisocyanates which contain carbodiimide groups, allophanate groups, isocyanurate groups, uretidione groups, urethane groups, acylated urea groups or biuret groups. The polyisocyanates preferably have an isocyanate functionality higher than 2, such as, for example, polyisocyanates of the uretidione or isocyanurate type produced by di- or trimerization of the above-mentioned diisocyanates. Further examples are polyisocyanates produced by reaction of the above-mentioned diisocyanates with water and containing biuret groups or polyisocyanates produced by reaction with polyols and containing urethane groups.

Of particular suitability are, for example, "coating polyisocyanates" based on hexamethylene diisocyanate, isophorone diisocyanate or dicyclohexylmethane diisocyanate. "Coating polyisocyanates" based on these diisocyanates means the per se known biuret, urethane, uretidione and/or isocyanurate group-containing derivatives of these diisocyanates.

As already mentioned above, the polyisocyanates may be used in blocked form, though this is not preferred. They may be blocked with conventional blocking agents that can be de-blocked under the action of heat, for example, with alcohols, oximes, amines and/or CH-acidic compounds.

The blocked or preferably free polyisocyanates may be used as such or as a preparation containing water and/or organic solvent, wherein in the case of free polyisocyanate no water and no organic solvent with active hydrogen is used. It may be desirable, for example, for the polyisocyanates to be pre-diluted with a water-miscible organic solvent or solvent mixture. In this case, it is preferable to use solvents, which are inert relative to isocyanate groups, especially where the preferred free polyisocyanates are used. Examples are solvents which do not contain any active hydrogen, for example, ethers, such as, for example, diethylene glycol diethyl ether, dipropylene glycol dimethyl ether; glycol ether esters, such as, ethylene glycol monobutyl ether acetate, diethylene glycol monobutyl ether acetate, methoxypropyl acetate; and N-methylpyrrolidone.

Also suitable are hydrophilic polyisocyanates, which may be stabilized in the aqueous phase by a sufficient number of ionic groups and/or by terminal or lateral polyether chains. Hydrophilic polyisocyanates are sold as commercial products, for example, by Bayer under the name Bayhydur®.

The pigment content of the coating compositions A consists of 0 to 100 wt. % of at least one aluminum platelet pigment having a platelet thickness from 200 to 500 nm, 0 to 90 wt. % of at least one interference platelet pigment C selected from the group consisting of metal oxide-coated aluminum oxide platelet pigments, metal oxide-coated silicon dioxide platelet pigments and metal oxide-coated mica platelet pigments, 0 to 15 wt. % of at least one carbon black pigment and 0 to 60 wt. % of at least one pigment other than aluminum platelet pigments, interference platelet pigments C and carbon black pigments, the sum of the wt. % being 100 wt. %, at least 40 wt. % of the pigment content being formed by the at least one aluminum platelet pigment and/or the at least one interference platelet pigment C, and a proportion of at least 20 wt. % of the at least one aluminum platelet pigment having a mean particle diameter from 6 to 15 μm. If a ratio by weight between such a pigment content and the resin solids from 0.2 to 0.5:1 in the coating composition A is adhered to, it is possible for UV light corresponding only to a UV transmission of less than 0.1% in the wavelength range from 280 to 380 nm and of less than 0.5 in the wavelength range from 380 to 400 nm to penetrate through a two-layer coating structure applied from the coating compositions A and B and, in each case, for the desired color shade of the multi-layer coating, which is subsequently provided with clear coat, to be achieved; i.e., assuming a given coating composition B and knowledge of the desired color shade and the film thicknesses prescribed for the coating compositions A and B, it is possible for the person skilled in the art to select the composition of the pigment content and the pigment/binder ratio by weight for the coating composition A within the respective ranges taught above.

The UV transmission may be measured in that a corresponding coating structure applied from the coating compositions A and B is applied to a UV light-transparent support, for example, a quartz glass plate, and the UV transmission is measured in the corresponding wavelength range using a corresponding uncoated, UV light-transparent support as a reference.

The pigment content of the coating compositions A may comprise one or more aluminum platelet pigments having a platelet thickness from 200 to 500 nm. If the coating composition A contains one or more aluminum platelet pigments having a platelet thickness from 200 to 500 nm, a proportion of at least 20 wt. % of these is in a relatively small particle size range, i.e., the mean particle diameter is from only 6 to 15 μm. In other words, 20 to 100 wt. % of the at least one aluminum platelet pigment may consist of only one or more different types of aluminum platelet pigments, each having a mean particle diameter from 6 to 15 μm. The remaining 0 to 80 wt. % of the at least one aluminum platelet pigment have a larger mean particle diameter, preferably from 17 to 25 μm, or, to put it differently, these 0 to 80 wt. % consist of only one or more different types of aluminum platelet pigments, each having a larger mean particle diameter, preferably from 17 to 25 μm. The term "mean particle diameter" refers to $d_{50}$ values determined by laser diffraction (50% of the particles have a particle diameter above and 50% of the particles have a particle diameter below the mean particle diameter), such as may be inferred, for example, from the technical documents of manufacturers of aluminum platelet pigments. The aluminum platelet pigments are, in particular, aluminum platelet pigments of the leafing or preferably non-leafing type that are conventional in paint and coatings and are known to the person skilled in the art; the aluminum platelet pigments may be passivated, for example, by what is known as phosphating (treatment with phosphoric and/or phosphonic acid derivatives), chromating or with a coating of a silicon-oxygen network. They may also be colored aluminum platelet pigments, such as, aluminum platelets coated with iron oxide or aluminum oxide.

Non-leafing aluminum platelet pigments passivated by phosphating are known. Examples of commercially available non-leafing aluminum platelet pigments passivated by phosphating are the non-leafing aluminum platelet pigments sold by the firm Eckart-Werke under the name "STAPA Hydrolac®".

Non-leafing aluminum platelet pigments passivated by chromating are known. Examples of commercially available non-leafing aluminum platelet pigments passivated by chromating are the non-leafing aluminum platelet pigments sold by the firm Eckart-Werke under the name "STAPA Hydrolux®".

Non-leafing aluminum platelet pigments coated with a silicon-oxygen network and their production are also known, for example, from WO 99/57204, U.S. Pat. No. 5,332,767 and from A. Kiehl and K. Greiwe, Encapsulated aluminum pigments, Progress in Organic Coatings 37 (1999), pp. 179 to 183. The surface of the non-leafing aluminum platelet pigments is provided with a coating of a silicon-oxygen network. The silicon-oxygen network can be connected to the surface of the non-leafing aluminum platelet pigments via covalent bonds.

The term "non-leafing aluminum platelet pigments coated with a silicon-oxygen network" includes in accordance with the above explanations both non-leafing aluminum platelet pigments with a coating of a purely inorganic silicon-oxygen network and non-leafing aluminum platelet pigments with a coating of a silicon-oxygen network modified with corresponding organic groups or polymer-modified.

Examples of commercially available non-leafing aluminum platelet pigments coated with a silicon-oxygen network are the non-leafing aluminum platelet pigments sold by the firm Eckart-Werke under the name "STAPA IL Hydrolan®" and those sold by the firm Schlenk under the name "Aquamet® CP".

The pigment content of the coating compositions A may comprise at least one interference platelet pigment C selected from the group consisting of metal oxide-coated aluminum oxide platelet pigments, metal oxide-coated silicon dioxide platelet pigments and metal oxide-coated mica platelet pigments. The metal oxide coating of the platelet pigments is, in particular, titanium, iron and/or chromium oxide layers. The interference platelet pigments C are known to the person skilled in the art as special effect pigments conventional in paint and coatings. The mean particle diameters, i.e. the $d_{50}$ values, which are determined by laser diffraction, of the interference platelet pigments C, are, for example, 8 to 22 μm.

The pigment content of the coating compositions A may comprise one or more carbon black pigments. These are carbon black-based black pigments conventional in paint and coatings and known to the person skilled in the art. Examples of commercially available carbon black pigments include Russ FW 200 by Degussa or Raven 5000 or Raven 410 D by Columbian Carbon.

The pigment content of the coating compositions A may comprise one or more pigments other than aluminum platelet pigments, interference platelet pigments C and carbon black pigments. Examples include special effect pigments other than the aforementioned pigments, and also inorganic or organic white, colored and black pigments, such as, for example, graphite effect-imparting pigments, iron oxide in flake form, liquid crystal pigments, titanium dioxide, iron oxide pigments, azo pigments, phthalocyanine pigments, quinacridone pigments, pyrrolopyrrole pigments, and perylene pigments.

As explained above, the selection of a specific pigment content of the coating composition A for a given coating composition B is dependent on the desired color shade and the film thicknesses prescribed for the coating compositions A and B. Three examples of preferred pigment contents of the coating composition A as a function of associated coating compositions B, each of which pertains to a particular group of problematic color shades, are provided below:

1) Combination of a coating composition A with a coating composition B having a light metallic color shade, the pigment content of the coating composition A consisting of 50 to 90 wt. % of at least one aluminum platelet pigment having a thickness from 200 to 500 nm, 0 to 40 wt. % of at least one interference platelet pigment C, 0 to 5 wt. % of at least one carbon black pigment and 5 to 20 wt. % of at least one pigment other than aluminum platelet pigments, interference platelet pigments C and carbon black pigments, the sum of the wt. % being 100 wt. % and a proportion of at least 20 wt. % of the at least one aluminum platelet pigment having a mean particle diameter from 6 to 15 μm.
2) Combination of a coating composition A with a coating composition B having a silver color shade, the pigment content of the coating composition A consisting of 80 to 100 wt. % of at least one aluminum platelet pigment having a thickness from 200 to 500 nm, 0 to 10 wt. % of at least one interference platelet pigment C, 0 to 5 wt. % of at least one carbon black pigment and 0 to 5 wt. % of at least one pigment other than aluminum platelet pigments, interference platelet pigments C and carbon black pigments, the sum of the wt. % being 100 wt. % and a proportion of at least 20 wt. % of the at least one aluminum platelet pigment having a mean particle diameter from 6 to 15 μm.

3) Combination of a coating composition A with a coating composition B having a special effect color shade with a high proportion of mica pigments in the pigment content, the pigment content of the coating composition A consisting of 0 to 20 wt. % of at least one aluminum platelet pigment having a thickness from 200 to 500 nm, 40 to 80 wt. % of at least one interference platelet pigment C, 0 to 15 wt. % of at least one carbon black pigment and 0 to 40 wt. % of at least one pigment other than aluminum platelet pigments, interference platelet pigments C and carbon black pigments, the sum of the wt. % being 100 wt. % and a proportion of at least 20 wt. % of the at least one aluminum platelet pigment having a mean particle diameter from 6 to 15 μm.

The process according to the invention is generally used to coat substrates in series in a color shade program comprising a plurality, for example, 10 to 15, color shades, i.e., a corresponding number of coating compositions B of different colors is used. However, the same number of differently pigmented coating compositions A does not have to be used; rather, a smaller number, for example, a single or a few, for example, 2 to 4, differently pigmented coating compositions A are generally sufficient.

The coating compositions A may also contain fillers, for example, in proportions from 0 to less than 20 wt. % based on the sum of the pigment content and fillers. The fillers do not constitute part of the pigment content of the coating compositions A. Examples are barium sulfate, kaolin, talcum, silicon dioxide, layered silicates and any mixtures thereof.

With the exception of the aluminum platelet pigments and the interference platelet pigments C, as well as the optional additional special effect pigments, the other pigments that are optionally contained in the pigment content are generally ground. The grinding may be performed in conventional assemblies known to the person skilled in the art. Generally, the grinding takes place in a proportion of the binder or in specific grinding resins (paste resins). The formulation is then completed with the remaining proportion of the binder or of the paste resin.

Aluminum platelet pigments, interference platelet pigments C and the optional additional special effect pigments are not ground, but are generally initially introduced in the form of a commercially available paste, optionally, combined with preferably water-miscible organic solvents and optionally additives, and then mixed with the binder or binders. Aluminum platelet pigments, interference platelet pigments C and optional additional special effect pigments in powder form may first be processed with preferably water-miscible organic solvents and optionally additives to yield a paste.

The water content of the coating compositions A is, for example, 60 to 82 wt. %.

The aqueous coating compositions A may contain conventional solvents, for example, in a proportion of 0 to 20 wt. %. Examples of such solvents are alcohols, for example, propanol, butanol, hexanol; glycol ethers or esters, for example, diethylene glycol di-C1-C6-alkyl ether, dipropylene glycol di-C1-C6-alkyl ether, ethoxypropanol, ethylene glycol monobutyl ether; glycols, for example, ethylene glycol and/or propylene glycol, and the di- or trimers thereof; N-alkylpyrrolidone, such as, for example, N-methylpyrrolidone; ketones, such as, methyl ethyl ketone, acetone, cyclohexanone; aromatic or aliphatic hydrocarbons, for example, toluene, xylene or linear or branched aliphatic C6-C12 hydrocarbons.

The aqueous coating compositions A may contain conventional additives in conventional quantities, for example, of 0.1 to 5 wt. %, relative to their solids content. Examples are antifoaming agents, wetting agents, adhesion promoters, catalysts, levelling agents, anticratering agents, thickeners and light stabilizers, for example, UV absorbers and/or HALS-based compounds (HALS, hindered amine light stabilizers). If the coating compositions A contain light stabilizers, these are by no means solely responsible for UV light being able to penetrate through a coating structure formed from coating compositions A and B only in accordance with a UV transmission of less than 0.1% in the wavelength range of from 280 to 380 nm and of less than 0.5% in the wavelength range of from 380 to 400 nm. This effect is instead, in particular with regard to the durability thereof, achieved by the pigment content of coating composition A.

The coating compositions B are water-borne base coats, such as are conventional in the production of base coat/clear coat two-layer coatings of car bodies and body parts. The aqueous coating compositions B are also referred in the present description and the claims as coating compositions B or as water-borne base coats B for short.

The water-borne base coats B have solids contents of, for example, 10 to 40 wt. %, preferably from 15 to 30 wt. %. The ratio by weight of pigment content to resin solids is, for example, 0.05:1 to 0.6:1. In addition to water, a resin solids content, which comprises binder(s), optionally, paste resin(s) and optionally, cross-linking agent(s), pigment(s), optionally, filler(s) and optionally, organic solvent(s), they contain in general also conventional additive(s).

The water-borne base coats B contain ionically and/or non-ionically stabilized binder systems. These are preferably anionically and/or non-ionically stabilized. Anionic stabilization is preferably achieved by at least partially neutralized carboxyl groups in the binder, while non-ionic stabilization is preferably achieved by lateral or terminal polyethylene oxide units in the binder. The water-borne base coats B may be physically drying or crosslinkable by formation of covalent bonds. The water-borne base coats B crosslinkable by forming covalent bonds may be self- or externally crosslinkable systems.

The water-borne base coats B contain one or more conventional film-forming binders. They may optionally also contain crosslinking agents if the binders are not self-crosslinkable or physically drying. Examples of film-forming binders, which may be used, are conventional polyester, polyurethane, (meth)acrylic copolymer and hybrid resins derived from these classes of resin. Selection of the optionally contained crosslinking agents depends, in a manner familiar to the person skilled in the art, on the functionality of the binders, i.e., the crosslinking agents are selected in such a way that they exhibit a reactive functionality complementary to the functionality of the binders. Examples of such complementary functionalities between binder and crosslinking agent are: carboxyl/epoxy, hydroxyl/methylol ether and/or methylol (methylol ether and/or methylol preferably, as crosslinkable groups of aminoplast resins, in particular, melamine resins).

The water-borne base coats B contain conventional pigments, for example, special effect pigments and/or pigments selected from among white, colored and black pigments.

Examples of special effect pigments are conventional pigments which impart to a coating color flop and/or lightness flop dependent on the angle of observation, such as, non-leafing metal pigments, for example, of aluminum, copper or other metals, interference pigments, such as, for example, metal oxide-coated metal pigments, for example, iron oxide-coated aluminum, coated mica, such as, for example, titanium dioxide-coated mica, graphite effect-imparting pigments, iron oxide in flake form, liquid crystal pigments, coated aluminum oxide pigments, coated silicon dioxide pigments.

Examples of white, colored and black pigments are the conventional inorganic or organic pigments known to the person skilled in the art, such as, for example, titanium dioxide, iron oxide pigments, carbon black, azo pigments, phthalocyanine pigments, quinacridone pigments, pyrrolopyrrole pigments, and perylene pigments.

The water-borne base coats B are, in particular, those having problematic color shades, i.e. coating compositions B that are distinguished in that UV light corresponding to a UV transmission of more than 0.1% in the wavelength range of from 280 to 380 nm and of more than 0.5% in the wavelength range of from 380 to 400 nm may penetrate through a two-layer coating structure consisting of a 10 μm thick layer applied from a mixture produced in a resin solids ratio by weight of 1.5 parts by weight coating composition B to 1 part by weight trimeric hexane diisocyanate-polyisocyanate (hexane diisocyanate-isocyanurate), and a 5 μm thick layer applied from the coating composition B itself.

In other words, the water-borne base coats B with problematic color shades have such low levels of pigmentation (ratio by weight of pigment content to resin solids content) and/or such pigment contents that, by virtue of the type and proportion of the constituent pigments, UV light corresponding to a UV transmission of more than 0.1% in the wavelength range of from 280 to 380 nm and of more than 0.5% in the wavelength range of from 380 to 400 nm may penetrate through a two-layer coating structure consisting of a 10 μm thick layer applied from a mixture produced in a resin solids ratio by weight of 1.5 parts by weight coating composition B to 1 part by weight trimeric hexane diisocyanate-polyisocyanate (hexane diisocyanate-isocyanurate), and a 5 μm thick layer applied from the coating composition B itself.

Desmodur® N 3600 from Bayer is a commercially available trimeric hexane diisocyanate-polyisocyanate that may be used, for example, in the aforementioned context.

The coating compositions B with problematic color shades accordingly have excessively low levels of pigmentation and/or pigment contents without or with excessively small proportions of pigments which effectively reduce UV transmission. Such water-borne base coats B with problematic color shades may be found among water-borne base coats B both with single color shades and with special effect color shades. Examples may in particular be found among water-borne base coats B with dark blue single color shades based on phthalocyanine pigments and among water-borne base coats B with specific special effect color shades, for example, dark blue metallic color shades or light metallic color shades, such as, in particular, silver color shades and among water-borne base coats B with specific special effect color shades containing elevated proportions, for example, 50 wt. % or more, of mica pigments (special effect pigments on the basis of coated, in particular, metal oxide-coated mica) in the pigment content. Coating compositions B with light metallic color shades or silver color shades as a specific subgroup of light metallic color shades are coating compositions when applied in an opaque film thickness and overcoated with a 35 μm thick clear coat exhibit a brightness L* (according to CIEL*a*b*, DIN 6174), measured at an illumination angle of 45 degrees to the perpendicular and an observation angle of 15 degrees to the specular reflection of at least 80 units.

The UV transmission measurement mentioned above may be carried out in that a two-layer coating consisting of a 10 μm thick layer applied from a mixture produced in a resin solids ratio by weight of 1.5 parts by weight coating composition B to 1 part by weight trimeric hexane diisocyanate-polyisocyanate (hexane diisocyanate-isocyanurate), and a 5 μm thick layer applied from the coating composition B itself is applied to a UV light-transparent support, for example, a quartz glass plate, and the UV transmission is measured in the corresponding wavelength range using a corresponding uncoated, UV light-transparent support as a reference.

The coating compositions B may also contain fillers, for example, in proportions of 0 to 30 wt. % relative to the resin solids content. The fillers do not constitute part of the pigment content of the coating compositions B. Examples are barium sulfate, kaolin, talcum, silicon dioxide, layered silicates and any mixtures thereof.

The special effect pigments are generally initially introduced in the form of a conventional commercial aqueous or non-aqueous paste, optionally, combined with preferably water-dilutable organic solvents and additives and then mixed with aqueous binder. Pulverulent special effect pigments may first be processed with preferably water-dilutable organic solvents and, optionally, additives to yield a paste.

White, colored and black pigments and/or fillers may, for example, be ground in a proportion of the aqueous binder. Grinding may preferably also take place in a special aqueous paste resin. Grinding may be performed in conventional assemblies known to the person skilled in the art. The formulation is then completed with the remaining proportion of the aqueous binder or of the aqueous paste resin.

The coating compositions B may contain conventional additives in conventional quantities, for example, of 0.1 to 5 wt. %, relative to their solids content. Examples are antifoaming agents, wetting agents, adhesion promoters, catalysts, levelling agents, anticratering agents, thickeners and light stabilizers, for example, UV absorbers and/or HALS-based compounds (HALS, hindered amine light stabilizers). If the coating compositions B contain light stabilizers, these are by no means solely responsible for UV light being able to penetrate through a coating structure formed from coating compositions A and B only in accordance with a UV transmission of less than 0.1% in the wavelength range of from 280 to 380 nm and of less than 0.5% in the wavelength range of from 380 to 400 nm. This effect is instead, in particular with regard to the durability thereof, achieved by the pigment content of coating composition A.

The water content of the coating compositions B is, for example, 60 to 90 wt. %.

The coating compositions B may contain conventional solvents, for example, in a proportion of preferably less than 20 wt. %, particularly preferably, less than 15 wt. %. These are conventional coating solvents, which may originate, for example, from production of the binders or are added separately. Examples of such solvents are alcohols, for example, propanol, butanol, hexanol; glycol ethers or esters, for example, diethylene glycol di-C1-C6-alkyl ether, dipropylene glycol di-C1-C6-alkyl ether, ethoxypropanol, ethylene glycol monobutyl ether; glycols, for example, ethylene glycol and/or propylene glycol, and the di- or trimers thereof; N-alkylpyrrolidone, such as, for example, N-methylpyrrolidone; ketones, such as, methyl ethyl ketone, acetone, cyclohexanone; aromatic or aliphatic hydrocarbons, for example, toluene, xylene or linear or branched aliphatic C6-C12 hydrocarbons.

In process step 1) of the process according to the invention, the EDC-primed substrates are spray-coated with the aqueous coating composition A in a dry film thickness of, 8 to 20 μm. This is preferably performed using electrostatically-assisted high-speed rotary atomization.

Then, preferably after a brief flash-off phase of, for example, 30 seconds to 5 minutes at an air temperature of 20 to 25° C., the aqueous coating composition B is spray-applied during process step 2) of the process according to the invention in a dry film thickness, below its black/white opacity, of 5 to 10 μm. This spray application is preferably pneumatic spray application. It is to be noted, that in any case the coating composition B applied in step 2) of the process according to the invention is different from the coating composition A applied in process step 1). This difference is determined at least with regard to differently composed pigment contents of the coating compositions A and B in question.

The spray-application of coating composition B) is preferably also followed by a brief flash-off phase of, for example, 30 seconds to 10 minutes at an air temperature of 20 to 100° C., after which the clear coat is applied during process step 3) of the process according to the invention in a dry film thickness of, for example, 20 to 60 μm.

All known clear coats are in principle suitable as the clear coat. Usable clear coats are both solvent-containing one-component (1 pack) or two-component (2 pack) clear coats, water-dilutable 1 pack or 2 pack clear coats, powder clear coats or aqueous powder clear coat slurries.

After an optional flash-off phase, the two-layer coating applied from the coating compositions A and B and the clear coat layer are jointly cured, for example, by baking, for example, at 80 to 160° C. object temperature during process step 4) of the process according to the invention.

The following examples illustrate the invention.

EXAMPLES

Example 1

Production of a Polyisocyanate Composition 1

30 pbw (parts by weight) of N-methylpyrrolidone, 46 pbw of a hydrophilic aliphatic polyisocyanate based on hexamethylene diisocyanate with an NCO value of 17.4 and 24 pbw of Desmodur® N 3600 from Bayer (trimerized hexamethylene diisocyanate with an NCO value of 23) were mixed.

Example 2

Production of a Polyisocyanate Composition 2

30 pbw of N-methylpyrrolidone and 70 pbw of Desmodur® N 3600 from Bayer were mixed.

Example 3

Production of a Coating Agent A1

100 pbw of the following composition were mixed with 10 pbw of the polyisocyanate composition 1:

10.4 pbw of resin solids (5.2 pbw of a polyester polyurethane resin, 2.1 pbw of a polyester acrylate resin, 1.2 part by weight of a polyurethane resin, 1.9 pbw of hexamethoxymethylmelamine; hydroxyl value of the resin solids 40.8 mg of KOH/g)

2.8 pbw of metal oxide-coated mica pigments (2.4 pbw of Iriodin® SW 9221 Rutile Fine Blue from Merck; 0.4 pbw of EXT Merlin Lumina® Turquoise T303D from Mearl-Engelhard)

0.4 pbw of PALIOGENBLAU® L 6480 from BASF
0.1 pbw of HELIOGENBLAU® L 6930 from BASF
0.6 pbw of HOSTAPERMROSA® E from Clariant
0.4 pbw of PALIOGENBLAU® L 6385 from BASF
0.5 pbw of carbon black FW 200 from Degussa
1.0 part by weight of talc
0.2 pbw of dimethylethanolamine
0.5 pbw of defoamer
0.6 pbw of polyacrylic acid thickener
0.8 pbw of polypropylene glycol 400

12.4 pbw of organic solvents (6.5 pbw of ethylene glycol monobutyl ether, 0.8 pbw of ethylene glycol monohexyl ether, 0.6 pbw of N-methylpyrrolidone, 1.5 pbw of n-butanol, 2.5 pbw of n-propanol, 0.5 pbw of Shellsol T)

69.3 pbw of water.

Example 4

Production of a Coating Agent B1

An aqueous water-borne base coat B1 of the following composition was produced:

10.2 pbw of resin solids (5.2 pbw of a polyester polyurethane resin, 2.1 pbw of a polyester acrylate resin, 1.0 part by weight of a polyurethane resin, 1.9 pbw of hexamethoxymethylmelamine; hydroxyl value of the resin solids 40.8 mg of KOH/g)

2.8 pbw of metal oxide-coated mica pigments (2.4 pbw of Iriodin® SW 9221 Rutile Fine Blue from Merck; 0.4 pbw of EXT Merlin Luminae Turquoise T303D from Mearl-Engelhard)

0.3 pbw of PALIOGENBLAU® L 6480 from BASF
0.1 pbw of HELIOGENBLAU® L 6930 from BASF
0.5 pbw of HOSTAPERMROSA® E from Clariant
0.3 pbw of PALIOGENBLAU® L 6385 from BASF
0.1 pbw of carbon black FW 200F from Degussa
1.0 part by weight of talc
0.2 pbw of dimethylethanolamine
0.5 pbw of defoamer
0.6 pbw of polyacrylic acid thickener
0.8 pbw of polypropylene glycol 400

12.4 pbw of organic solvents (6.5 pbw of ethylene glycol monobutyl ether, 0.8 pbw of ethylene glycol monohexyl ether, 0.6 pbw of N-methylpyrrolidone, 1.5 pbw of n-butanol, 2.5 pbw of n-propanol, 0.5 pbw of Shellsol T)

70.2 pbw of water.

Example 5

Production of a Coating Agent B1'

100 pbw of the water-borne base coat B1 were mixed with 10 pbw of the polyisocyanate composition 1.

Example 6

Production of a Coating Agent B1"

100 pbw of the water-borne base coat B1 were mixed with 9.7 pbw of the polyisocyanate composition 2.

Example 7

Production of a Coating Agent A2

100 pbw of the following composition were mixed with 10 pbw of the polyisocyanate composition 1:

12.2 pbw of resin solids (5.9 pbw of a polyester polyurethane resin, 6.3 pbw of a polyester acrylate resin; hydroxyl value of the resin solids 38.5 mg of KOH/g)

4.1 pbw of non-leafing aluminum platelet pigments (2.1 pbw of Stapa Hydrolac® WH66NL, non-leafing aluminum platelet pigment with a platelet thickness of 200 to 300 nm and a mean particle diameter of 14 μm, 2.0 pbw of Stapa Hydrolac® WHH 44668, non-leafing aluminum platelet pigment with a platelet thickness of 200 to 300 nm and a mean particle diameter of 18 μm; Hydrolac®, aluminum platelet pigments from Eckart)

0.2 pbw of dimethylethanolamine 0.5 pbw of defoamer 0.6 pbw of polyacrylic acid thickener 1.2 pbw of polypropylene glycol 400

12.8 pbw of organic solvents (7.3 pbw of ethylene glycol monobutyl ether, 0.8 pbw of N-methylpyrrolidone, 2.3 pbw of n-butanol, 2.4 pbw of n-propanol)

68.4 pbw of water.

Example 8

Production of a Coating Agent B2

A silver-colored, water-borne base coat B2 of the following composition was produced:

12.2 pbw of resin solids (5.9 pbw of a polyester polyurethane resin, 6.3 pbw of a polyester acrylate resin; hydroxyl value of the resin solids 38.5 mg of KOH/g)

4.1 pbw of non-leafing aluminum platelet pigments (1.6 pbw of Stapa Hydrolac® WHH 2154, non-leafing aluminum platelet pigment with a platelet thickness of 300 to 500 nm and a mean particle diameter of 19 μm; 1.5 pbw of Stapa Hydrolac® WHH 2156, non-leafing aluminum platelet pigment with a platelet thickness of 300 to 500 nm and a mean particle diameter of 16 μm; 1.0 pbw of Stapa Hydrolac® WHH 44668, non-leafing aluminum platelet pigment with a platelet thickness of 200 to 300 nm and a mean particle diameter of 18 μm; Hydrolac®, aluminum platelet pigments from Eckart)

0.2 pbw of dimethylethanolamine 0.5 pbw of defoamer 0.6 pbw of polyacrylic acid thickener 1.2 pbw of polypropylene glycol 400

12.8 pbw of organic solvents (7.3 pbw of ethylene glycol monobutyl ether, 0.8 pbw of N-methylpyrrolidone, 2.3 pbw of n-butanol, 2.4 pbw of n-propanol)

68.4 pbw of water.

Example 9

Production of a Coating Agent B2'

100 pbw of the water-borne base coat B2 were mixed with 10 pbw of the polyisocyanate composition 1.

Example 10

Production of a Coating Agent B2"

100 pbw of the water-borne base coat B2 were mixed with 11.6 pbw of the polyisocyanate composition 2.

Example 11

Measurement of the UV Transmission of Coating Structures a) The coating agents A1, B1' and B1" respectively were each applied to a quartz glass plate by means of electrostatically-assisted high-speed rotary atomization.

After 2 minutes flashing off at room temperature, the water-borne base coat B1 was pneumatically spray-applied in each case in a film thickness below black/white hiding power, flashed off for 5 minutes at 70° C. and baked for 15 minutes at 140° C. Then, the UV transmission of the quartz glass plates coated in this way with two-layer coating structures was photometrically determined (uncoated quartz glass plate in reference beam path; UV irradiation from the coated side).

Similar experiments were carried out with coating agents A2, B2' and B2" respectively, in each case in combination with water-borne base coat B2.

The results are shown in Table 1.

TABLE 1

| Coating structure with | UV transmission in the wavelength range | |
|---|---|---|
| layer thickness in μm | 280 to 380 nm | 380 to 400 nm |
| 10 μm A1 + 5 μm B1 (according to the invention) | 0-0.01% (ok, below 0.1%) | 0.01-0.15% (ok, below 0.5%) |
| 10 μm B1' + 5 μm B1 (comparison example) | 0-0.2% | 0.2-1.2% |
| 10 μm B1" + 5 μm B1 | 0-0.2% | 0.2-1.3% |
| 10 μm A2 + 5 μm B2 (according to the invention) | 0-0.09% (ok, below 0.1%) | 0.09-0.16% (ok, below 0.5%) |
| 10 μm B2' + 5 μm B2 (comparison example) | 0-0.5% | 0.5-0.6% |
| 10 μm B2" + 5 μm B2 | 0-0.5% | 0.5-0.6% |

What is claimed is:

1. A process for the production of multi-layer coatings comprising the successive steps:

1) applying a 8 to 20 μm thick coating layer from an aqueous coating composition A onto a substrate provided with an EDC primer, 2) applying a base coat layer from an aqueous coating composition B in a film thickness, below its black/white opacity, of 5 to 10 μm onto the previously applied coating layer, 3) applying a clear coat layer onto the base coat layer, 4) jointly curing the three coating layers, wherein coating compositions A and B being different from each other, the coating composition A having a ratio by weight of pigment content to resin solids of 0.2 to 0.5:1, the pigment content consisting of 0 to 100 wt. % of at least one aluminum platelet pigment having a platelet thickness from 200 to 500 nm, 0 to 90 wt. % of at least one interference platelet pigment C selected from the group consisting of metal oxide-coated aluminum oxide platelet pigments, metal oxide-coated silicon dioxide platelet pigments and metal oxide-coated mica platelet pigments, 0 to 15 wt. % of at least one carbon black pigment, and 0 to 60 wt. % of at least one pigment other than aluminum platelet pigments, interference platelet pigments C and carbon black pigments, the sum of the wt. % being 100 wt. %, at least 40 wt. % of the pigment content being formed by the at least one aluminum platelet pigment and/or the at least one interference platelet pigment C, and a proportion of at least 20 wt. % of the at least one aluminum platelet pigment having a mean particle diameter from 6 to 15 μm, wherein the coating compositions B having problematic color shades which are distinguished in that UV light corresponding to a UV transmission of more than 0.1% in the wavelength range of from 280 to 380 nm and/or of more than 0.5% in the wavelength range of from 380 to 400 nm may penetrate through a two-layer coating structure consisting of a 10 μm thick layer applied from a mixture produced in a resin solids ratio by weight of 1.5 parts by weight coating composition B to 1 part by weight trimeric hexane diisocyanate-polyisocyanate, and a 5 μm thick layer applied from the coating composition B itself.

2. The process of claim 1, wherein the sum of the coating thickness for the two-layer coatings produced from the coating compositions A and B is 15 to 30 μm.

3. The process of claim 1, wherein the resin solids of coating composition A comprise polyurethane resin and/or are crosslinkable by formation of urethane groups.

4. The process of claim 1, wherein the remaining 0 to 80 wt. % of the at least one aluminum platelet pigment have a mean particle diameter from 17 to 25 μm.

5. The process of claim 1, wherein the substrate provided with an EDC primer is selected from the group consisting of automotive bodies and body parts.

6. Substrate coated with a multi-layer coating produced according to the process of any one of the preceding claims.

* * * * *